United States Patent
Guyader

(10) Patent No.: US 7,591,356 B2
(45) Date of Patent: Sep. 22, 2009

(54) DECOUPLING SLEEVE

(75) Inventor: Gilles Guyader, Saint Cezert (FR)

(73) Assignee: Microturbo SA, Toulouse (FR)

( * ) Notice: Subject to any disclaimer, the term of this patent is extended or adjusted under 35 U.S.C. 154(b) by 347 days.

(21) Appl. No.: 11/475,145

(22) Filed: Jun. 27, 2006

(65) Prior Publication Data

US 2007/0000746 A1 Jan. 4, 2007

(30) Foreign Application Priority Data

Jun. 30, 2005 (FR) ................................ 05 51835

(51) Int. Cl.
*F16D 7/04* (2006.01)
(52) U.S. Cl. ................ 192/55.1; 192/56.56; 192/69.81
(58) Field of Classification Search ................ 192/56.1, 192/110 R, 56.56, 55.61, 69.81; 464/32, 464/37, 38, 39
See application file for complete search history.

(56) References Cited

U.S. PATENT DOCUMENTS

| | | | |
|---|---|---|---|
| 2,724,299 A | 11/1955 | Amtsberg | |
| 2,881,888 A * | 4/1959 | Amtsberg | 192/56.53 |
| 2,942,481 A * | 6/1960 | Gilbert | 74/7 C |
| 4,768,634 A | 9/1988 | Quick et al. | |
| 4,842,110 A * | 6/1989 | Luckhurst | 192/16 |
| 4,842,118 A * | 6/1989 | Puzio et al. | 192/150 |
| 4,871,296 A * | 10/1989 | Laessle et al. | 415/123 |
| 4,977,989 A * | 12/1990 | Ashikawa et al. | 192/56.42 |
| 5,305,666 A * | 4/1994 | LaTorre | 81/55 |
| 6,059,085 A | 5/2000 | Farnsworth | |

\* cited by examiner

*Primary Examiner*—Richard M. Lorence
(74) *Attorney, Agent, or Firm*—Oblon, Spivak, McClelland, Maier & Neustadt, L.L.P.

(57) ABSTRACT

The invention relates to a decoupling sleeve having driving and driven shafts connected by dog clutches. The driving shaft transmits torque to the driven shaft in one direction during a forward direction of rotation where a rod-shaped connecting member is connected to two shafts so that the connecting member is detached from one of the shafts if subject to a reverse torque beyond a specific threshold. The two shafts become free in rotation relative to one another upon this detachment.

17 Claims, 2 Drawing Sheets

DECOUPLING SLEEVE

BACKGROUND OF THE INVENTION

1. Field of the Invention

The present invention relates to the field of turbine engines and refers to a decoupling sleeve of which the function is to ensure the transmission of torque between an engine shaft and a coaxial shaft which it drives.

2. Description of Related Art

In the field of turbine engines, to ensure the start-up of a turbojet engine, for example, a starter means is used such as a turbine starter which drives the shaft of the engine to be started in rotation until said shaft functions independently. A known starter is driven by air. The pneumatic power issuing from a different engine during operation or from an auxiliary power unit is transformed into mechanical power by means of a turbine. A reduction gear reduces the speed of the turbine to an acceptable value for the driven device such as the accessory gear box of the turbojet engine. The kinematic chain comprises, in particular, a free wheel which allows the starter to be disengaged once the engine has started up.

For safety reasons, a coupling member is arranged between the starter shaft and the shaft of the machine to be started which has means for decoupling the two shafts to prevent damage to one or other of the machines which could arise in the case of malfunction. This coupling member is designated hereinafter by the term decoupling sleeve.

The functions generally assigned to this sleeve are as follows:

During forward operation, it transmits a starter torque from the starter to the shaft of the machine which is driven, such as a shaft of the accessory gear box in a gas turbine engine, it limits the torque transmitted in this forward direction.

it prevents the free wheel from jamming which would be damaging to the starter, by preventing the starter from being driven at a specific speed in the reverse direction.

It is apparent that this last function is difficult to ensure as the levels of reverse torque for the sleeve to function are low. Moreover, it is difficult to fulfill this condition without making the sleeve fragile.

Devices are known which ensure this decoupling function when reverse torque occurs.

Patent U.S. Pat. No. 4,871,296 discloses a device consisting of two splined shafts joined by dog clutch jaws. In the forward direction of torque transmission, the dog clutch jaws drive the two shafts. When a reverse torque predetermined by the compression of a spring is attained, the dog clutch jaws are separated from one another. When a ring, mounted on a rod attached to the driving shaft, abuts a planar portion attached to the driven shaft, it prevents the two shafts from continuing to separate until the reverse torque is sufficient to cause the rod to fracture (a fracture zone has been provided on the rod for this purpose). The decoupling therefore takes place when the frangible rod is broken in traction.

Patent U.S. Pat. No. 6,059,085 discloses a similar device. The sleeve consists of two splined shafts joined by dog clutch jaws, by means of which the torque in the forward direction is transmitted. When a reverse torque predetermined by the compression of the spring is attained, the dog clutch jaws are separated from one another. A pin mounted transversely on a coaxial rod and attached to the driving shaft, abuts in the slots of a ring. This ring is attached to the driven shaft. A preferred fracture zone is provided on the rod and the decoupling takes place when the frangible rod is broken in torsion.

It is observed that this type of solution with the fracture either in traction or in torsion of a frangible rod transmitting the torques, exhibits a certain lack of robustness. More specifically, the fracture zones provided on the rods, whether in traction or in torsion, are relatively thin.

They are sensitive:

to misalignments of the splines which cause locking torques liable to fatigue the metal;

to parasitic reverse torques induced by the machine which is driven, such as the accessory gear box in a gas turbine engine.

The fracture due to fatigue of the frangible rod may therefore induce untimely fractures of the decoupling sleeve which reduces reliability during the operation of the starter.

SUMMARY OF THE INVENTION

The present invention aims to alleviate the drawbacks encountered with sleeves of the prior art.

According to the invention, the decoupling sleeve comprising a coaxial driving shaft and a coaxial driven shaft, connected by dog clutch jaws, by means of which the driving shaft transmits engine torque to the driven shaft in one direction, a connecting member being connected to the first of the two shafts on the one hand, and to the second shaft on the other hand, such that the connecting member is detached from the first shaft in the event of reverse torque occurring beyond a specific threshold, the two shafts being then free relative to one another, is characterized in that the connecting member is connected by screwing to a nut which is mobile in translation relative to the first shaft against a return spring and mobile in rotation over a limited angle, the connecting member being detached from the first shaft by unscrewing the nut.

The first shaft is preferably the driven shaft.

By ensuring the decoupling, no longer by the fracture of a frangible rod but By unscrewing a screw or a nut, it was possible to observe that the sleeve was much less sensitive to parasitic loads. Moreover, the reverse torque of the decoupling is measured by the force required to open the dog clutch jaws and determined by the control of the spring.

According to a further feature, the connecting member is mobile in rotation over a limited angle. This angular displacement also makes the sleeve less sensitive to parasitic loads. Nevertheless, it is also within the scope of the invention to provide a zero angle.

Advantageously, the connecting member is in the shape of a rod which is coaxial to the two shafts and, in particular, the rod is held by a pin on the second shaft.

According to a preferred embodiment, the first shaft comprises an axial bore in which the nut is housed, in addition to a return spring of the nut in the axial direction. More particularly, the nut comprises at least one surface forming an abutment in rotation, cooperating with a surface forming an abutment attached to the first shaft.

According to a further feature, the dog clutch jaws comprise teeth with surface portions, cooperating with one another to transmit the torque of the driving shaft in a direction of rotation and surface portions which are angled relative to the axis of rotation, cooperating with one another such that the dog clutch jaws are separated from one another when the transmitted torque is reversed.

According to a further feature, the sleeve comprises a preferred fracture zone for limiting the torque transmitted in the forward direction.

BRIEF DESCRIPTION OF THE DRAWING(S)

A non-limiting embodiment of the invention will now be described with reference to the drawings, in which.

DETAILED DESCRIPTION OF THE PREFERRED EMBODIMENTS

Figure 1:
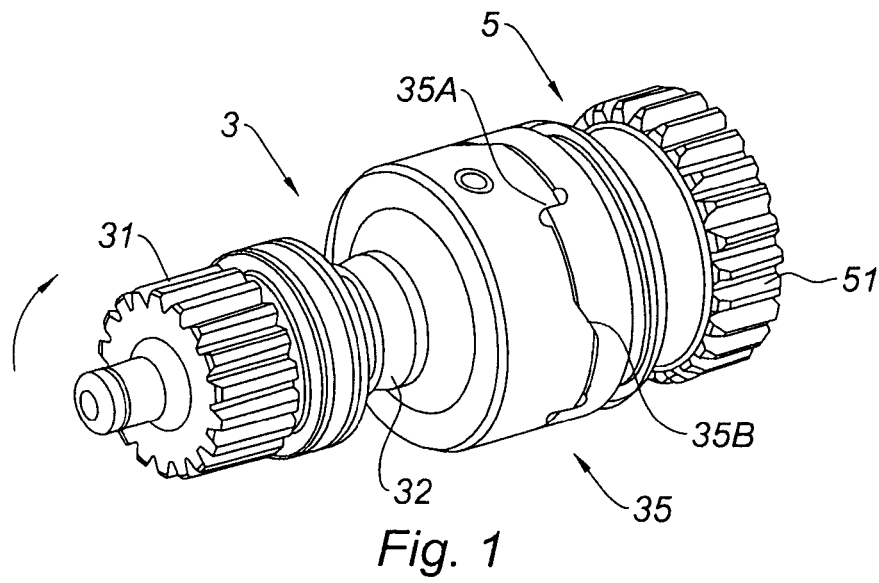
FIG. 1 is a perspective view of a coupling sleeve between a starter and a turbojet engine.

The sleeve of the invention is shown in FIG. 1, according to an isometric view. It comprises a first element 3, with an axis of revolution, with a splined driving shaft 31 and connected by dog clutch jaws 35 to a second element 5, with an axis of revolution, with a splined driven shaft 51. These dog clutch jaws 35 are formed by the cylindrical ends of the two elements 3 and 5 applied against one another and each comprising teeth with radial surfaces 35A on one side, and surfaces 35B which are angled relative to the aforementioned surfaces on the other side. A frangible portion 32 fractures when the torque transmitted exceeds a specific value. During forward operation the driving shaft 31, turning in the direction of the arrow, drives the shaft 51 by means of dog clutch jaws 35 and radial surfaces 35A.

Figure 2:
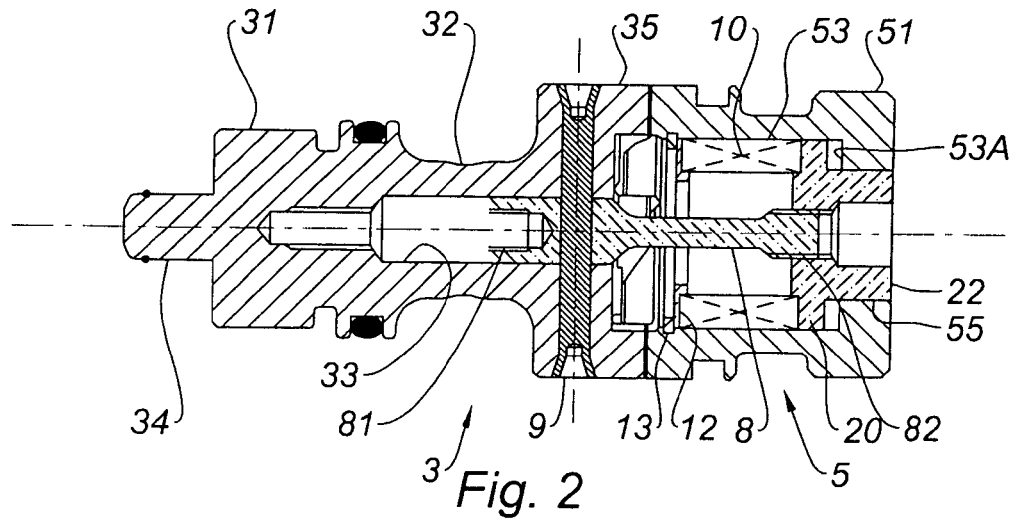
FIG. 2 is an axial sectional view of the sleeve of FIG. 1 in the coupled state.
Figure 3:
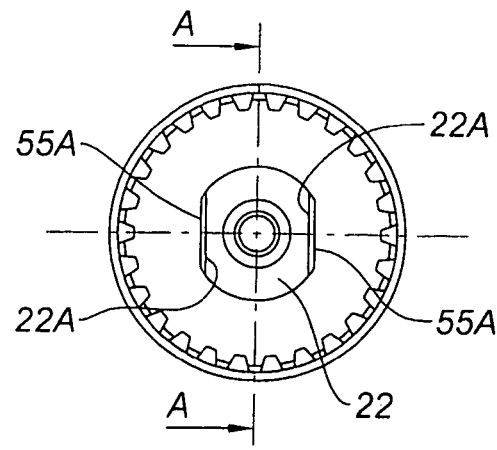
FIG. 3 is a front view of the sleeve in the coupled state.

In FIG. 2 the sleeve is seen in axial section in the direction AA of FIG. 3. The element 3 comprises an axial bore 33 in which an end portion 81 of an axial rod 8 is housed. This rod is held by a pin 9 passing through the element 3. The rod 8 is extended within an axial bore 53 provided in the element 5. The rod 8 is threaded at its end at 82. Within this bore 53 a nut 20 is located which is mobile in translation between an annular shoulder 53A of the bore and an annular return spring 10. The nut is able to slide without play in the bore. The spring 10 bears against a spacer 12 blocked by a stop ring 13 housed in an annular groove provided in the bore on the dog clutch side.

The nut 20 comprises a portion 22 opposite the spring 10 and which slides in an axial housing 55 provided in the element 5 in the extension of the bore 53. The shape of the portion 22 and its housing 55 is seen in FIG. 3. The portion 22 is of elongated shape and comprises two parallel sides 22A which are spaced from two parallel sides 55A of the housing 55, so as to allow the nut 20 to pivot about its axis relative to the element 5 over a specific angle. The angular displacement is, for example, 5 degrees.

The nut 20 is threaded at its centre and receives the threaded end 82 of the rod 8.

The operation of the device is disclosed hereinafter.

The sleeve is attached to the starter by means of a locking ring 34.

In the forward direction of transmission of the torque, the driving shaft drives the driven shaft by means of the dog-clutch surfaces 35A.

Figure 5:
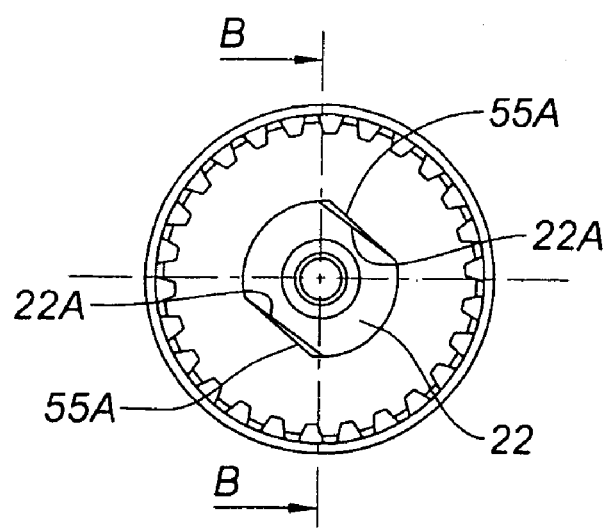
FIG. 5 is a front view of the sleeve in the decoupled state.

When reverse torque occurs, beyond a threshold of the torque predetermined by the compression force of the spring 10, the dog clutch jaws slide on angled surfaces 35B. The nut is then driven in rotation relative to the element 5 until the planar sides 22A of the portion 22 bear against the planar sides 55A of the housing 55. The position adopted by the nut relative to the element 5 is seen in FIG. 5. If the reverse torque continues, whilst the rod 8 is held by the pin 9 in the element 3 the nut is unscrewed. After a specific number of rotations defined by the length of thread 82 engaged in the nut, the decoupling takes place.

At this moment, the nut is pushed back by the compression spring 10 and abuts against the shoulder 53A. The two elements 3 and 5 are then free relative to one another.

Figure 4:
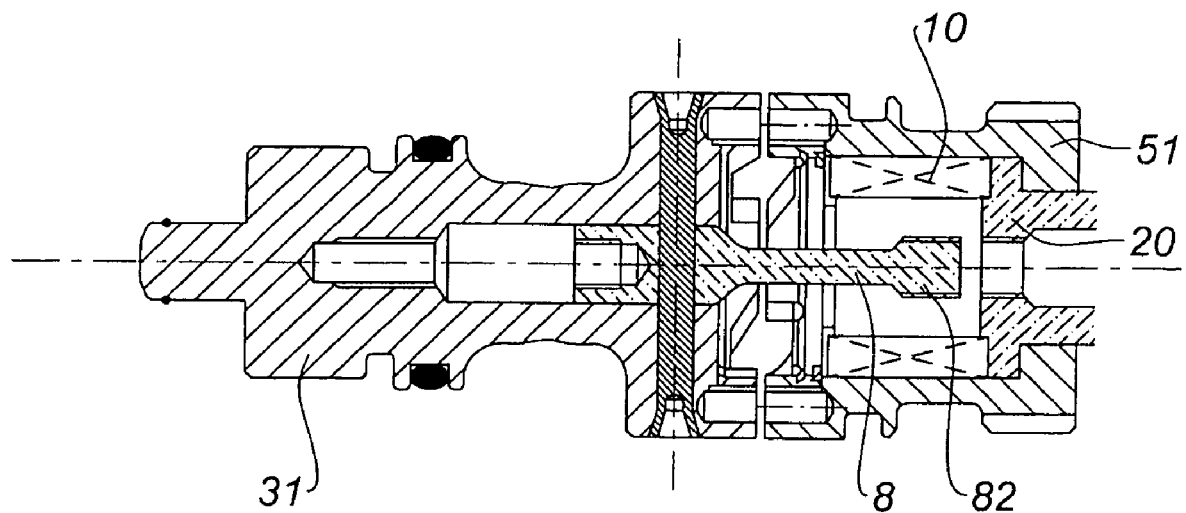
FIG. 4 is an axial sectional view of the sleeve of FIG. 1 in the decoupled state.

The relative position of the two elements 3 and 5 after decoupling has been shown in FIG. 4 which is an axial sectional view in the direction BB of FIG. 5.

The invention claimed is:

1. A decoupling sleeve, comprising:
   a coaxial driven shaft assembly, including:
      a driven shaft,
      a threaded nut having a nut thread, the nut being mobile in axial translation relative to the driven shaft and being mobile in rotation to the driven shaft over a limited angle, and
      a return spring;
   a coaxial driving shaft;
   a set of dog clutch jaws, the dog clutch jaws configured to connect the driving shaft to the driven shaft, and to allow the driving shaft to transmit engine torque to the driven shaft in a forward direction of rotation; and
   a connecting member having a connecting member thread, the connecting member configured to be connected to the driving shaft, said connecting member adapted to be connected to the driven shaft via a threaded interface to the nut, the threaded interface configured to allow the connecting member to detach from the nut after an event of reverse torque beyond a threshold so that the driven and driving shafts become free in rotation relative to one another, the threaded interface including the nut thread and the connecting member thread,
   wherein the return spring is configured to exert an axial force on the threaded nut and the driven shaft, and the spring is configured to increase a distance between the nut thread and the connecting member thread when the nut and the connecting member detach after the reverse torque beyond the threshold.

2. The sleeve according to claim 1 of which the connecting member is in the shape of a rod which is coaxial to the two shafts.

3. The sleeve according to claim 2, wherein the rod is connected to the driving shaft via a pin interface which limits axial movement of the rod relative to the driving shaft.

4. The sleeve according to claim 1, of which the driven shaft comprises an axial bore with an opening at one end of the bore, the opening configured to allow insertion and axial movement of the nut and the spring within the bore.

5. The sleeve according to claim 4, wherein the nut includes a surface forming an abutment in rotation, cooperating with a surface forming an abutment attached to the driven shaft.

6. The sleeve according to claim 1, wherein the set of dog clutch jaws include a set of opposing teeth, the opposing teeth include a set of primary tooth surfaces to transmit the torque of the driving shaft to the driven shaft in the forward direction of rotation, and a set of secondary angled tooth surfaces which separate the jaws when the transmitted torque is reversed.

7. The sleeve according to claim 1, wherein the sleeve includes a preferred fracture zone for limiting the torque transmitted in the forward direction of rotation from the driving shaft to the driven shaft.

8. The sleeve according to claim 1, wherein the limited angle is five degrees.

9. A decoupling sleeve, comprising:
   two shafts including a coaxial driving shaft and a coaxial driven shaft, the two shafts connected by a set of dog clutch jaws by means of which the driving shaft transmits engine torque to the driven shaft in one direction during forward operation; and a connecting member being connected to a first of the two shafts on the one hand and to a second of the two shafts on the other hand such that the connecting member is detached from the first of the two shafts in an event of reverse torque occurring beyond a specific threshold, the two shafts being then free in rotation relative to one another, characterized in that the connecting member is connected by screwing to a nut which is mobile in translation relative to the first of the two shafts against a return spring and mobile in rotation over a limited angle, the connecting member being detached from the first of the two shafts by unscrewing the nut.

10. The sleeve according to claim 9, wherein the first of the two shafts is the driven shaft.

11. The sleeve according to claim 9, wherein the connecting member is in the shape of a rod which is coaxial to the two shafts.

12. The sleeve according to claim 11, wherein the rod is connected to the driven shaft via a pin interface which limits axial movement of the rod relative to the driven shaft.

13. The sleeve according to claim 9, wherein the driving shaft includes an axial bore with an opening at one end of the bore, the opening adapted to allow insertion and axial movement of the nut and the spring within the bore.

14. The sleeve according to claim 13, wherein the nut includes a surface forming an abutment in rotation, cooperating with a surface forming an abutment attached to the driving shaft.

15. The sleeve according to claim 9, wherein the set of dog clutch jaws include a set of opposing teeth, the opposing teeth include a set of primary tooth surfaces to transmit the torque of the driving shaft to the driven shaft in the forward direction of rotation, and a set of secondary angled tooth surfaces which separate the jaws when the transmitted torque is reversed.

16. The sleeve according to claim 9, wherein the sleeve includes a preferred fracture zone for limiting the torque transmitted in the forward direction of rotation from the driving shaft to the driven shaft.

17. The sleeve according to claim 9, wherein the limited angle is five degrees.

* * * * *